United States Patent [19]

Schueler et al.

[11] Patent Number: 4,985,494

[45] Date of Patent: Jan. 15, 1991

[54] THERMOPLASTIC MOLDING COMPOSITIONS, AND A PROCESS FOR THE PRODUCTION THEREOF

[75] Inventors: Ralf Schueler, Recklinghausen; Joachim Muegge, Haltern; Michael Droescher, Dorsten; Wilfried Bartz; Roland Feinauer, both of Marl, all of Fed. Rep. of Germany

[73] Assignee: Huels Aktiengesellschaft, Marl, Fed. Rep. of Germany

[21] Appl. No.: 482,493

[22] Filed: Feb. 21, 1990

Related U.S. Application Data

[62] Division of Ser. No. 333,281, Apr. 5, 1989, Pat. No. 4,923,926.

[30] Foreign Application Priority Data

Jun. 3, 1988 [DE] Fed. Rep. of Germany ....... 3818871

[51] Int. Cl.$^5$ ............................................ C08L 69/00
[52] U.S. Cl. ..................................... 525/67; 525/133; 525/146; 525/148
[58] Field of Search .................. 525/67, 133, 146, 148

[56] References Cited

U.S. PATENT DOCUMENTS 4,705,827 11/1987 Kodama ................................ 525/67

Primary Examiner—John C. Bleutge
Assistant Examiner—David Buttner
Attorney, Agent, or Firm—Oblon, Spivak, McClelland, Maier & Neustadt

[57] ABSTRACT

A thermoplastic molding composition comprising 70 to 98 parts of an aromatic polycarbonate having a viscosity number of from 40 to 100 cm$^3$/g and 2 to 30 parts of a polyoctenylene or a modified polyoctenylene.

12 Claims, No Drawings

THERMOPLASTIC MOLDING COMPOSITIONS, AND A PROCESS FOR THE PRODUCTION THEREOF

This is a division of application Ser. No. 07/333,281, filed on Apr. 5, 1989 now U.S. Pat. No. 4,923,926.

BACKGROUND OF THE INVENTION

Field of the Invention

Description of the Background

Polycarbonates are distinguished by high strength and toughness. However, the stress cracking resistance of moldings produced from pure polycarbonates is not satisfactory. For this reason, blends of polycarbonates with poly(alkylene terephthalates) are frequently employed in industry as disclosed, for example, in DE-OS 1,694,124.

In industry, the comparatively low low-temperature impact strength of polycarbonates is regarded as unsatisfactory. For this reason, there is interest in molding compositions which contain, besides polycarbonates and, if appropriate, poly(alkylene terephthalates), additional components which improve the low-temperature impact strength. Thus, for example, the addition of acrylonitrile-butadienestyrene copolymers to polycarbonates is described in U.S. Pat. No. 4,172,103. Further, improvement in the impact strength through addition of polyether esters is revealed in EP-OS 0,150,454.

It has been proposed to improve the impact strength of moldings based on polycarbonates by selectively adding hydrogenated styrene-diene block copolymers to polycarbonates. In addition, U.S. Pat. No. 4,320,212 discloses acrylate copolymers as impact modifying additives for polycarbonate molding compositions. Further, it is known that the impact strength of polycarbonates can be improved by the added presence of copolymers based on ethylene and unsaturated functionalized monomers (cf. DE-OS 3,004,942, DE-OS 3,234,174, EP-OS 0,020,605 and EP-OS 0,106,027). Finally, the notched impact strength of polycarbonates is also increased by the added presence of functionalized rubbers (cf. DE-OS 2,343,609, JP-OSS 82/92,045 and 83/136,652).

However, the known mixtures do not exhibit satisfactory low-temperature notched impact strength (cf. EP-OS 0,106,027). In a number of cases, the impact modifying component is difficult to disperse in the polymer matrix. If high energy is employed to improve distribution of the impact modifying component, thermal damage to the polymer matrix cannot be excluded.

Molding compositions which contain polymers having a glass transition temperature lower than −20° C. in addition to polycarbonates and poly(alkylene terephthalates) can be processed to form moldings having a low tendency to warp. However, this does not improve the impact strength (cf. DE-OS 3,118,697). For this reason, it would not be apparent to one skilled in the art to employ polyoctenylenes whose glass transition temperature is −80° C. as impact modifiers in polycarbonate compositions. Further, there are doubts as to the compatibility and dispersibility of the two polymers. This is because experiments have shown that, in the customary process for the production of molding compositions based on polycarbonates, polyoctenylenes do not improve, but, in contrast, even slightly impair, the impact strength at room temperature. This surely does not lead one skilled in the art to consider polyoctenylenes as impact modifiers. A need therefore continues to exist for a polycarbonate composition of improved impact strength properties.

SUMMARY OF THE INVENTION

Accordingly, one object of the present invention is to provide a polycarbonate molding composition from which molded objects can be prepared which have a high notched impact strength at temperatures about 0° C., enhanced toughness, good stress cracking resistance and high strength.

Briefly, this object and other objects of the present invention as hereinafter will become more readily apparent can be attained by a thermoplastic molding composition comprising 70 to 98 parts of an aromatic polycarbonate having a viscosity number of from 40 to 100 cm$^3$/g, and 2 to 30 parts of a polyoctenylene or a modified polyoctenylene containing functional groups.

DETAILED DESCRIPTION OF THE PREFERRED EMBODIMENTS

Although the notched impact strength of a polycarbonate at room temperature is lower when polyoctenylenes are added than is the case without this addition, it has now been observed that this strength is clearly increased at temperatures below 0° C.—compared with moldings containing no polyoctenylene. In the case of molding compositions based on polycarbonates and poly(alkylene terephthalates), the notched impact strength—both at room temperature and at low temperature can be improved considerably by adding polyoctenylenes, if the latter are modified and if the mixtures obtained are subjected to thermal aftertreatment.

For the purposes of the present invention, the polycarbonate ingredient can be a homopolycarbonate or a copolycarbonate. The polycarbonate ingredient is preferably based on a diphenol, such as, for example, dihydroxydiphenyl, di(hydroxyphenyl)alkane or a di(hydroxyphenyl) ether. In principle, however, all other diphenols which are suitable for the preparation of polycarbonates can be used. For details in this respect, see the monograph by H. Schnell, "Chemistry and Physics of Polycarbonates", Interscience Publ., New York 1964, and U.S. Pat. No. 2,999,835 and DE-OS 2,248,817. Polycarbonates based on 2,2-di(4-hydroxyphenyl)propane known as "bisphenol A" are particularly preferred. Polycarbonates are synthesized in a manner known per se. Further details in this respect are available, for example, in U.S. Pat. No. 2,999,835 and GB Pat. No. 772,627.

The polycarbonates preferably have viscosity numbers (J values) of from 20 to 100 cm$^3$/g, measured in as described in DIN 7744, part 2, at a concentration of 0.5% in dichloromethane.

The polyoctenylenes ingredient can be obtained by polymerization from cyclooctene with the aid of a so-called metathesis catalyst with ring opening (DE-OS 1,570,940, 1,645,038, 1,720,798, 1,770,143 and 1,805,158, DE-AS 1,299,868, GB Pat. No. 1,124,456, 1,194,013 and 1,182,975, and K. J. Ivin, Olefin Metathesis, pp. 190 ff. (1983), Academic Press.)

The double bonds in the polyoctenylene may be in the cis- or trans-form. A preferred polyoctenylene is one which has a trans-double bond content of at least 60%, in particular at least 80%.

Suitable polyoctenylenes are those having a viscosity number of from 50 to 250 cm$^3$/g, preferably 80 to 160 cm$^3$/g, measured at 25° C. in toluene at a concentration of 0.5 g/100 cm$^3$ of solution.

The polyoctenylenes may contain epoxy, carboxyl, carboxylic anhydride or carboxylic ester groups as functional groups. These functional groups are introduced by known processes in solution or in the melt. Epoxy groups can be introduced into the polyoctenylene, for example, by partial epoxidation of the double bonds using peracids. The content of epoxyoxygen should be 0.5 to 9, preferably 3 to 8, % by weight. Alternatively, suitable epoxy derivatives are obtained by grafting the likes of such epoxy group containing molecules as glycidyl methacrylate onto the polyoctenylenes. On the other hand, carboxyl and carboxylic anhydride groups are introduced into the polyoctenylene by grafting using suitable unsaturated monomers, such as, for example, (meth)acrylic acid, maleic acid or anhydride, fumaric acid, maleic acid esters, fumaric acid esters, norbornenedicarboxylic anhydride, itaconic acid or anhydride, and the corresponding methyl, ethyl and butyl esters of the acids. Experience has shown that it is sufficient to employ 0.2 to 5 percent by weight, preferably 0.5 to 4 percent by weight, of the monomer, based on the modified polyalkenamers.

The grafting of monomer can be carried out in solution or in the melt with or without free radical-forming additives. Examples of such processes can be found in U.S. Pat. No. 3,882,194 and DE-OS 2,401,149. The degree of grafting can be determined by IR spectroscopy.

When introducing the functional groups into the polyoctenylenes, care should be taken that no crosslinking occurs. The gel content of the modified polyoctenylenes, determined as the insoluble content in hot toluene, should therefore be less than 10 percent by weight, preferably less than 5 percent by weight.

The average diameter of the optionally modified polyoctenylene particles in the molding compositions of the invention should preferably be less 10 $\mu$m, in particular less than 1 $\mu$m. These requirements can be achieved by good dispersion.

For the purposes of the invention, polyesters are taken to mean linear, film- or fiber-forming, partially crystalline products obtained by the condensation of aromatic dicarboxylic acids having from 8 to 14 carbon atoms and at least one glycol of the formula HO(CH$_2$)$_n$OH where n=2 to 12, and/or neopentyl glycol and-/or 1,4-cyclohexanedimethanol. Up to 20 mol-% of the aromatic dicarboxylic acids may be replaced by (cyclo)aliphatic dicarboxylic acids having 2 to 12 carbon atoms.

A preferred group of polyesters comprises the poly(alkylene terephthalates), where up to 20 mol-% of the terephthalic acid may be replaced by another dicarboxylic acid, such as, for example, isophthalic acid, phthalic acid, cyclohexane-1,4-dicarboxylic acid, adipic acid, azelaic acid or decanedicarboxylic acid. Preferred poly(alkylene terephthalates) are poly(ethylene terephthalate) and poly(butylene terephthalate). Up to 20 mol-% of the ethylene glycol in poly(ethylene terephthalates) may be replaced by other customary diols, such as, for example, 1,4-butanediol, 1,3-propanediol, 1,6-hexanediol, neopentyl glycol, 1,4-dimethylolcyclohexane and 1,12-dodecanediol, and up to 20 mol-% of the 1,4-butanediol in the poly(butylene terephthalate) may be replaced by other customary diols, such as, for example, ethylene glycol, 1,3-propanediol, 1,6-hexanediol, 1,4-dimethylolcyclohexane and 1,12-dodecanediol.

The molecular weights of the polyesters should be adjusted so that they have viscosity numbers (J values) ranging from 80 to 240 cm$^3$/g, measured as described in DIN 53 728, part 3, at a concentration of 0.5 g in 100 cm$^3$ of solvent.

The additives include customary stabilizers, plasticizers, processing auxiliaries, lubricants, mold-release auxiliaries, antistatics, colorants and flame retardants. It is also possible to employ fillers and reinforcing substances such as minerals, glass or carbon fibers, glass microbeads, carbon black, inter alia.

The components of the present composition can be intimately mixed without difficulties in the likes of a commercially available twin-screw kneader. It is preferably ensured here that the average diameter of the polyoctenylene particles is less than 10 $\mu$m, in particular less than 1 $\mu$m. If the mixing action is additionally supported, by using screws with, for example, kneading blocks or toothed discs, high throughputs can be achieved.

Mixing is normally achieved as a melt base in which the temperature is usually 10° to 80° C. above the melting point of the polymers.

In the production of molding compositions containing polyesters, free-radical formers, that is to say, for example, commercially available azo compounds or peroxides, preferably dialkyl peroxides or alkyl peracid esters, are preferably employed. Bis-t-alkyl peroxides and t-alkyl peracid esters which are liquid at 50° C., in particular at room temperature, and are stable at the application temperature are particularly preferred. Suitable peroxides include free-radical formers such as t-butyl perneodecanoate, t-amyl perpivalate, t-butyl perpivalate, bis(3,5,5-trimethylhexanoyl) peroxide, diocctanoyl peroxide, didecanoyl peroxide, dilauroyl peroxide, t-butyl per(2-ethylhexanoate), t-butyl perisobutyrate, t-butylpermaleate, 1,1-bis(t-butylperoxy)-3,3,5-trimethylcyclohexane, 1,1-bis(t-butylperoxy)cyclohexane, t-butyl peroxyisopropylcarbonate, t-butyl per(3,5,5-trimethylhexanoate), 2,5-dimethylhexyl 2,5-diperbenzoate, t-butyl peracetate, t-butyl perbenzoate, 5-amyl perbenzoate, 2,2-bis(t-butyl peroxy)butane, dicumyl peroxide, 2,5-dimethylhexane-2,5-di-t-butyl peroxide, t-butyl cumyl peroxide, bis(t-butylperoxy)-3,5-dimethyl-1,2-dioxolane, di-t-butyl peroxide, 2,5-dimethyl-3-hexyne-2,5-di-t-butyl peroxide, bis(t-butylperoxyisopropyl)benzene and, in particular, 2,2'-azobis(2-acetoxybutane) and 2,2'-azo bis(2-acetoxypropane).

The organic free-radical formers are normally employed in amounts of from 0.05 to 5 percent by weight, preferably from 0.1 to 3 percent by weight, based on the total amount of polycarbonate, polyoctenylene and polyester.

It is possible to introduce the free-radical former into the melt as early as during or just after mixing the polymer components under conditions which do not cause spontaneous decomposition of the free-radical formers. However, it is also possible to first prepare the mixture of the components separately and then, in a separate step, for example, during incorporation of further auxiliaries and additives, to admix the free-radical former. A further possibility is to apply the free-radical former in liquid form to solid granules and to allow it to diffuse into the granules. It is also possible to use the free-radical former in solution. The solvents can be removed again during or after the decomposition phase by applying a vacuum, for example the degassing step during extrusion. It is advantageous to introduce the free-radical formers together with liquid auxiliaries and additives, so long as the latter do not induce any undesired decomposition. The vapor pressure of the free-radical formers should preferably be less than 1 bar during the impregnation phase in order to avoid additional technical measures.

The free-radical former must have the opportunity to penetrate into the granules and to act on the components. This means, inter alia, that the temperature of the molding compositions must not be more than 10° C. below the softening point of the mixture.

In general, a period of exposure of 4 half live periods at the particular temperature is sufficient if the free-radical former is distributed homogeneously.

The polyester-containing molding composition should be subjected to thermal aftertreatment, for example in a degassing extruder. To this end, the composition, in the form of granules, is warmed for several hours in the absence of oxygen, preferably in a fluidized bed, at a temperature $\geq 5°$ below the temperature at which the composition begins to melt. However, the temperature is preferably at least 150° C. The thermal aftertreatment can also advantageously be carried out by the methods described in German Pat. Nos. 3,033,468 and 3,333,469.

In principle, the additives can be introduced into the composition at any stage of the process, so long as it is ensured that break-down of the free-radical former is not affected in an undesired manner. The correlations between the basicity of the additives and the free-radical breakdown are known to those skilled in the art or can easily be determined by means of comparative experiments.

Having now generally described this invention, a further understanding can be obtained by reference to certain specific examples which are provided herein for purposes of illustration only and are not intended to be limiting unless otherwise specified.

The notched impact strength tests of DIN 53 453, employed as a comparison criterion, were carried out on small injection-molded test specimens at the temperatures stated. Between injection-molding and testing, the specimens were stored for 24 hours at a relative humidity of 60%.

All amounts given are in parts and % are taken to mean parts by weight and % by weight respectively, unless otherwise stated.

The J values of the compounds were determined as described in DIN 53 728, part 3, in a mixture of phenol and o-dichlorobenzene (weight ratio 1:1) at a concentration of 0.5%. The J values of the polyoctenylene were determined analogously as described in DIN 53 726.

The melt viscosity (MVI) was determined as described in DIN 53 735 at 250° C. and at a load of 2.16 kg.

POLYOCTENYLENE

(A) Polyoctenylene

A polyoctenylene having a J value of 120 ml/g and a trans double bond content of 80% is known and is commercially available under the name VESTENAMER ® 8012 (manufacturer: HULS AKTIENGESELLSCHAFT). Further properties of this product are given in the journal "Kautschuk, Gummi, Kunststoffe", 1981, pages 185 to 190, and in the Huls data sheet No. 2247 "VESTENAMER ® 8012".

(B) Fumaric acid-modified polyoctenylene

2 Parts by weight of fumaric acid and 98 parts by weight of polyoctenylene (A) above were reacted at 310° C. in a twin-screw extruder (type ZE 40 from Messrs. Berstorff, Maschinenbau GmbH, Postfach 629, D-3000 Hanover 1) and subsequently granulated. By comparing the IR spectra of the original extrudate and of the product purified of free monomers by transfer, it could be seen that more than 80% of the fumaric acid is bound.

Gel content: <1 percent by weight
Viscosity number J=111 cm$^3$/g

(C) Maleic anhydride-(MA-)modified polyoctenylene

1 Part by weight of maleic anhydride and 99 parts of polyoctenylene (A) above were reacted at 310° C. in a twin-screw extruder (type ZE 40—Messrs. Berstorff) and subsequently granulated. By comparing the IR spectra of the original extrudate and of the product purified from free monomers by transfer, it could be seen that more than 80% of the MA is bound.

Gel content: <1 percent by weight
Viscosity number J=111 cm$^3$/g

PRODUCTION OF MOLDING COMPOSITIONS CONTAINING POLYCARBONATES AND POLYOCTENYLENES

Examples 2-1 to 2-9

Commercially available polycarbonate (J=60 cm$^3$/g, DUROLON 2500, a medium-viscosity polycarbonate from Polycarbonato do Brasil s.a. Salvador/Bahia) and the particular polyoctenylene were mixed at 270° C. in a kneader (automatic, ZCM-41/46 from Apparate-Maschinenbau Henschel GmbH, Ostring 19, D-8754 Grossostheim 2) as described by data in Table 1, extruded as a strand, granulated and dried.

Examples 2-10 to 2-14

Polycarbonate (MAKROLON ® 2800, J=63 cm$^3$/g, a medium-viscosity product from Bayer AG, D-5090 Leverkusen; for further details, see "Anwendungstechnische Information" [Applicational information sheet] No. 387/84) was mixed at 270° C. with various amounts of a functionalized polyoctenylene as described in (C) above in a kneader (automatic, ZCM-41/46), extruded as a strand, granulated and dried.

For all the products, the J values were measured as described in DIN 53 728, part 3, the MVI (250/5) as described in DIN 53 735 and the notched impact strength as described in DIN 53 453 at −20° C. and −40° C. (cf. Table 2).

PRODUCTION OF THE MOLDING COMPOSITIONS BASED ON POLYCARBONATES, POLYESTERS AND POLYOCTENYLENES (see 25 Table 3)

Comparative Examples A and B

Commercially available poly(butylene terephthalate) (J=30 110 cm$^3$/g, VESTODUR ® 1000 from HULS AKTIENGESELLSCHAFT), a commercially available polycarbonate (J=63 cm$^3$/g, MAKROLON ® 2800) and the functionalized poly-octenylene as described above in (B) were mixed at 260° C. in a BUSS co-kneader, type MDK E 46-11D as available. Buss AG, CH-4133 Pratteln, 1, Switzerland, in accordance with the data in Table 3, extruded as a strand, granulated and dried.

Comparative Examples C and D

In each case, one part of the products obtained in accordance with Examples A and B was aftertreated for 24 hours at 200° C. under a nitrogen atmosphere in a tumble drier.

Comparative Example E

One part of the product obtained in accordance with Example A was aftertreated under nitrogen with 1 percent by weight of t-butyl perbenzoate for 3 hours at 90° C., for 2 hours at 150° C. and for 16 hours at 200° C.

Example 3-1

A mixture having a composition as in Example B was treated with 1 part by weight of t-butyl perbenzoate and subsequently treated for 16 hours at 200° C. under nitrogen.

departing from the spirit or scope of the invention as set forth herein.

What is claimed as new and desired to be secured by Letters Patent of the United States is:

1. A thermoplastic molding composition comprising:
   70 to 98 parts of an aromatic polycarbonate having a viscosity number of from 40 to 100 cm$^3$/g,
   2 to 30 parts of a polyoctenylene or a modified polyoctenylene containing functional groups, and, based on 100 parts of polycarbonate, from 20 to 80 parts of a polyester having a viscosity number of 80 to 240 cm$^3$/g of an aromatic dicarboxylic acid with a dihydric aliphatic alcohol.
2. The thermoplastic molding composition according to claim 1, wherein the polyoctenylene possesses epoxy, acid, acid anhydride or acid ester functional groups.
3. The thermoplastic molding composition according to claim 1, which further contains at least one additional ingredient selected from the group consisting of stabilizers, plasticizers, processing auxiliaries, lubricants, mold-

TABLE 1

| | 2-1 | 2-2 | 2-3 | 2-4 | 2-5 | 2-6 | 2-7 | 2-8 | 2-9 |
|---|---|---|---|---|---|---|---|---|---|
| Parts Durolon 2500 | 100 | 90 | 80 | 90 | 80 | 90 | 80 | 90 | 80 |
| Parts VESTENAMER 8012 | — | 10 | 20 | — | — | — | — | — | — |
| Parts VESTENAMER 8012/0.5 MA | — | — | — | 10 | 20 | — | — | — | — |
| Parts VESTENAMER 8012/1.2 MA | — | — | — | — | — | 10 | 20 | — | — |
| Parts VESTENAMER 8012/1.5 MA | — | — | — | — | — | — | — | 10 | 20 |
| Solution viscosity J DIN 53 728 cm$^3$/g | 58 | 58 | 57 | 62 | 63 | 63 | 64 | 62 | 63 |
| Melt index MVI (280/5) DIN 53 735 cm$^3$/10 min | 34.5 | 36.2 | 32.9 | 17.2 | 12.6 | 15.6 | 10.5 | 15.8 | 9.6 |
| Notched impact strength 23° C. ISO 180 kJ/m$^2$ | 82 | 58.5 | 39.8 | 64.8 | 46.8 | 65.2 | 51.8 | 61.6 | 51.6 |
| 0° C. | 11.9 | 40.5 | 39.2 | 55 | 35.9 | 53.6 | 43.8 | 50.9 | 46.8 |
| −20° C. | 11.1 | 22.9 | 29.2 | 38.4 | 26.4 | 32.5 | 25.9 | 24.9 | 29.3 |
| −40° C. | 10.9 | 20.9 | 22.6 | 24.9 | 20.3 | 23.1 | 20.5 | 21.4 | 22 |

TABLE 2

| | 2-10 | 2-11 | 2-12 | 2-13 | 2-14 |
|---|---|---|---|---|---|
| Parts MAKROLON ® 2800 | 100 | 95 | 92.5 | 87.5 | 85 |
| Parts VESTENAMER ® 8012/0.5 MA | — | 5 | 7.5 | 12.5 | 15 |
| Solution viscosity J DIN 53 728 cm$^3$/g | 63 | 63 | 65 | 64 | 64 |
| Melt index MVI (280/5) DIN 53 735 cm$^3$/10 min | 21.5 | 20.4 | 19.7 | 18.2 | 16.5 |
| Notched impact strength −20° C. ISO 180 kJ/m$^2$ | 14.2 | 33 | 54.1 | 55.3 | 54.2 |
| −40° C. | 11.8 | 18.8 | 23.5 | 42.9 | 50.9 | release auxiliaries, antistatics, colorants and flame retardants, fillers and reinforcing substances.

4. The thermoplastic molding composition according to claim 1 wherein said polyester is a polyalkylene terephthalate in which up to 20 mole % of the terephthalic acid is replaced by another dicarboxylic acid and in which up to 20 mole % of the alkylene glycol from which the given polyester is prepared is replaced by another alkylene glycol.
5. The thermoplastic molding composition according to claim 4, wherein said dicarboxylic acid, other than said terephthalic acid, is isophthalic acid, phthalic acid, cyclohexane-1,4-dicarboxylic acid, adipic acid, azelaic acid or decanedicarboxylic acid and wherein said alkyl-

TABLE 3

| | A | B | C | D | E | 3-1 |
|---|---|---|---|---|---|---|
| Parts of polyester | 60 | 55 | 60 | 55 | 60 | 55 |
| Parts of polycarbonate | 40 | 35 | 40 | 35 | 40 | 35 |
| Parts of modified polyoctenylene | — | 10 | — | 10 | — | 10 |
| Aftertreatment: | | | | | | |
| Parts of peroxide | — | — | — | — | 1 | 1 |
| 90° C. | — | — | — | — | 3 h | 3 h |
| 150° C. | — | — | — | — | 4 h | 4 h |
| 200° C. | — | — | 20 h | 20 h | 16 h | 16 h |
| Solution viscosity J DIN 53 728 cm$^3$/g | 84 | 85 | 120 | 119 | 110 | 129 |
| Melt index MVI (250/5) DIN 53 735 cm$^3$/10 min | 48 | 42 | 17 | 9.2 | 18 | 7.8 |
| Notched impact strength 23° C. DIN 53 453 kJ/m$^3$ | 4.9 | 6.5 | 12.1 | 11/11PF | 11.4 | 11/11PF |
| 0° C. | 3.7 | 4.6 | 5.9 | 19.8 | 5 | 11/11PF |
| −20° C. | 3.5 | 4.5 | 4.9 | 13.6 | 4.8 | 30.9 |
| −40° C. | 3.3 | 3.8 | 4.7 | 9.9 | 4.3 | 13.5 |

Having now fully described the invention, it will be apparent to one of ordinary skill in the art that many changes and modifications can be made thereto without ene glycol, other than alkylene glycol from which the polyester is prepared, is 1,4-butanediol, 1,3-propanediol, 1,6-hexanediol, neopentyl glycol, 1,4-dimethylolcyclohexane or 1,12-dodecanediol.

6. The thermoplastic molding composition according to claim 1, wherein said polycarbonate is a diphenol based material.

7. The thermoplastic molding composition according to claim 1, wherein said polycarbonate is formed from 2,2-di(4-hydroxyphenyl)propane.

8. The thermoplastic molding composition according to claim 1, wherein the particle size of said polyoctenylene or modified polyoctenylene is less than 10 μm.

9. The thermoplastic molding composition according to claim 1, wherein the gel content of said polyoctenylene or modified polyoctenylene is less than 10% by weight.

10. A process for the production of a thermoplastic molding composition, comprising:

intimately mixing from 70 to 98 parts by weight of an aromatic polycarbonate having a viscosity number of from 40 to 100 cm$^3$/g, from 2 to 30 parts by weight of a polyoctenylene or a modified polyoctenylene containing functional groups and from 20 to 80 parts by weight of a polyester having a viscosity number of 80 to 240 cm$^3$/g, based on 100 parts by weight of said polycarbonate; and thermally treating the mixed composition obtained.

11. The process of claim 10, wherein the mixed composition is treated at a temperature of at least 150° C.

12. The process of claim 10, wherein a liquid free radical forming compound in an amount of from 0.05 to 5% by weight, based on the total quantity of the molding composition, is further added to the composition.

* * * * *